Feb. 23, 1932.  I. P. NELSON  1,846,448
LIFTER DEVICE AND EMERGENCY WHEEL
Filed July 14, 1930
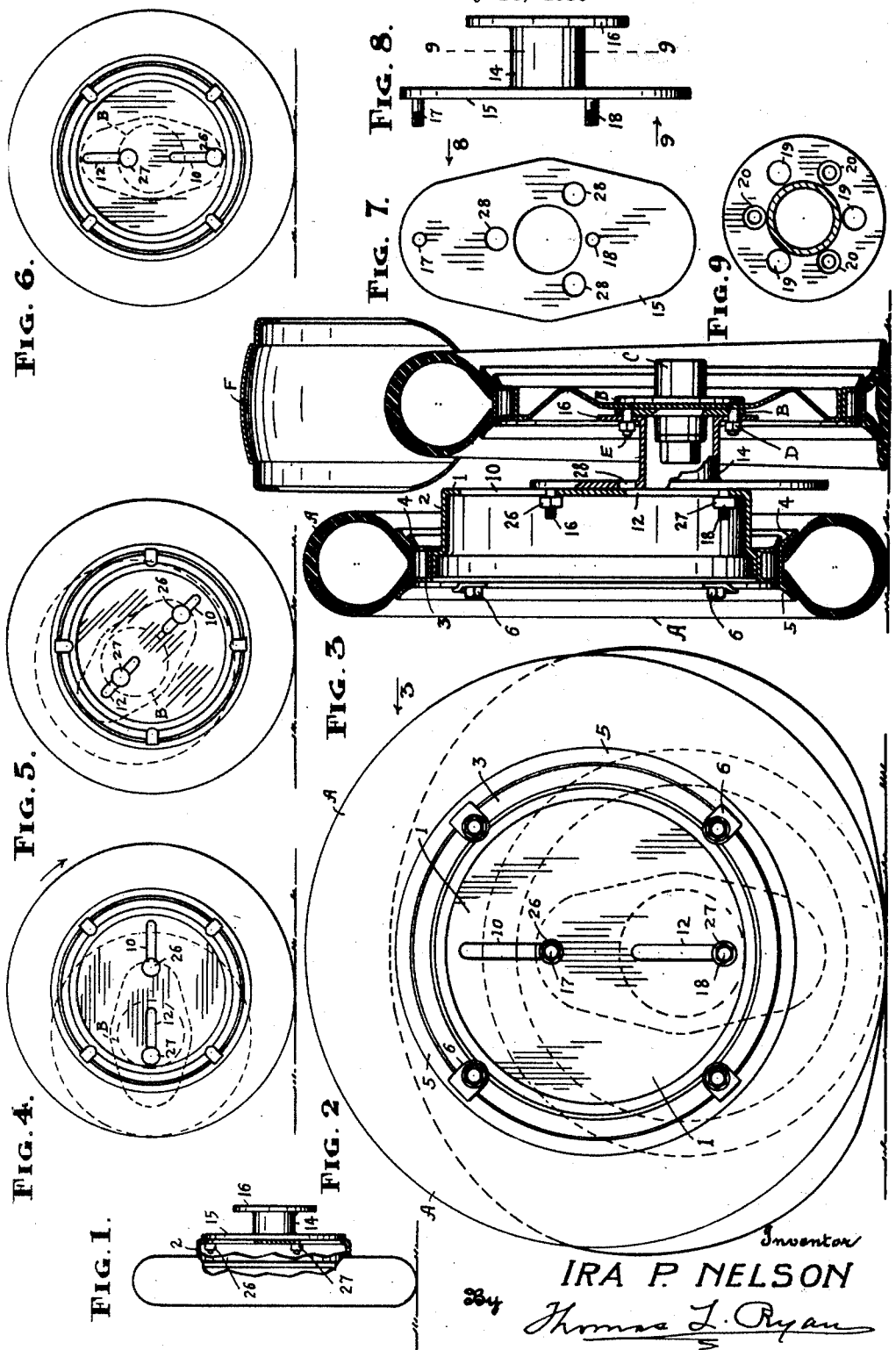
Inventor
IRA P. NELSON
By Thomas L. Ryan
Attorney Patented Feb. 23, 1932

1,846,448

UNITED STATES PATENT OFFICE

IRA P. NELSON, OF MONTPELIER, INDIANA

LIFTER DEVICE AND EMERGENCY WHEEL

Application filed July 14, 1930. Serial No. 467,665.

To overcome the inconvenience incident to the disabling of the automobile wheel due to accidental deflation of the tire, and to enable the car to be run to its destination where repairs may be made, the present invention contemplates the providing of a lifting device and emergency wheel which renders unnecessary the use of a lifting jack, or special tools.

Objects of the invention are to provide a device of the kind described which is composed of relatively few parts, is economical of manufacture, is relatively light in weight, and capable of being easily applied to use.

My invention is embodied in, and its objects are accomplished by the new construction, combination and arrangement of parts illustrated in the accompanying drawings, and described in the following specification. The invention is defined in the appended claims.

The several parts of my improved lifting device and emergency wheel, are identified by suitable characters of reference, in the different views of the drawings.

Figure 1 is an edge view of my improved lifter device and emergency wheel, a portion of the tire and the body structure of the wheel being broken away.

Figure 2 is an enlarged front view of my improved lifter device and emergency wheel disposed in position connected to the disabled wheel, the related position of the latter and the irregular contour of the deflated tire being indicated by the dotted lines.

Figure 3 is a vertical central cross section view, taken on the line 3—3 and as seen in the direction indicated by arrow 3 in Figure 2.

Figure 4 is a view, on a reduced scale, showing in dotted lines, the changed position of the disabled wheel, when the emergency wheel will have been moved rotatably one quarter of a revolution.

Figure 5 is a view similar to Figure 4, the emergency wheel having been moved three eighths of a revolution.

Figure 6 is a view similar to Figure 4, the emergency wheel having been moved one half of a revolution.

Figure 7 is a front view of the yoke element of my invention.

Figure 8 is a side view of Figure 7 as seen in the direction of arrow 8 in Figure 7.

Figure 9 is a cross section view taken on the line 9—9 and as seen in direction of the arrow 9 in Figure 8.

The invention contemplates the providing of a wheel having a body structure provided with aligned spaced radial guideways, a yoke having a body portion of formation to clear the hub of the disabled wheel and being provided with a frontal cheek having studs thereon to be disposed slidingly in the said guideways, and there being a rear cheek on said yoke member adapted to be fastened to the disabled wheel, whereby the axis of the yoke is coincident with the axis of the disabled wheel, and devices in connection with the said studs to removably retain the emergency wheel in loose united relation with the yoke, and which said devices are operable to secure the said wheel against movement on the said yoke.

In practicing the invention the yoke is secured to the disabled wheel (which by reason of its deflated tire will have settled to the road surface). The emergency wheel is then disposed so that the studs of the yoke occupy the radial guideways. Nuts screwed on the studs serve to retain the emergency wheel loosely united with the yoke. With a movement of the vehicle a distance to turn the wheel through one half of a revolution, the yoke will have come to a position reverse to the initial position thereof shown, the vehicle wheel having been lifted to position with its axis coincident with the axis of the emergency wheel. The nuts on the studs are then tightened, the emergency wheel being thereby secured to the yoke. Besides having served to lift the disabled wheel, my device now serves to support the wheel and its load, and to perform all of the functions that are performed by the other wheels of the car.

The emergency wheel consists of a sheet metal structure of formation in cross section as shown in Figure 3, there being the disk shaped body portion 1, the annular portion 2, and the usual felly 3, and lip 4. The tire rim 5 is connected to the felly by the usual bolt and clip detail 6. Seated in the rim is the usual tire A. Slots which I have designated as guideways 10 and 12, are spaced equidistant from the center of the wheel, and they are in radial alignment, as shown plainly in Figure 2.

The present embodiment of my invention is of the size and proportions, and its details are of the construction especially suitable for an automobile wheel of conventional type, the diameter of whose tire A is twenty-nine inches, and the flange portion B of whose hub C is secured by six nuts D.

The yoke may be made of malleable iron or of cast or pressed steel, the last named material being preferred. The body portion 14 may be cylindrical in form and it is of diameter to clear the hub C of the disabled wheel, as shown in Figure 3. Formed integral with the ends of the said body portion 14, are cheeks of plate like formation, one being designated as the frontal cheek 15, and the other being designated as the rear cheek 16. The frontal cheek 15 is of oblong formation and it is provided with the fixed studs 17 and 18. These studs are spaced in eccentric relation to the axial center of the yoke, as shown in Figure 7, and their head portions are threaded.

The function of the cheek member is to afford means adapted for being secured to the disabled wheel in such manner that the center of the body portion of the yoke is coincident with the axis of the disabled wheel. In the present instance this rear cheek 16 is circular in formation and is adapted to be disposed immediately against the flange B of the hub of the disabled wheel.

Of the six holes spaced in the said rear cheek, three of them, namely the holes marked 19, (see Figure 9) are of diameter to pass the nuts D of the hub plate B of the disabled wheel. The other three holes, namely the holes marked 20, are of diameter to pass the bolts E of the hub of the disabled wheel, and each is provided with a suitable counterbore to accommodate the nuts D. The function of the spaced holes 28 in the front plate 15 of the yoke will presently be referred to.

The invention complete and in form as carried on the car as regular equipment, appears as in Figure 1. In case of a letting down of the vehicle wheel, the nuts 26 and 27 are removed from the studs 17 and 18, the yoke being then disassociated from the emergency wheel. Three of the nuts D of the disabled wheel are then removed from their bolts E. The yoke is then disposed in position, its holes 19 clearing the bolts E and the nuts D thereon, and the holes 20 being engaged by the bolts E whose nuts will have been removed. The removed nuts D are then screwed on the bolts E, the cheek 16 being thereby secured to the hub plate B of the disabled wheel, as shown in Figure 3. Tightening of these nuts is accomplished by passing the shank of an ordinary brace type socket wrench through the holes 28 of the cheek 15. The emergency wheel is then disposed in such position that its guideways 10 and 12 are engaged by the studs 17 and 18 respectively. Then with the application of nuts 26 and 27 to the studs 17 and 18 respectively, the emergency wheel is retained in loosely united relation with the yoke.

The lifting of the disabled wheel is accomplished by simply moving the car one-half revolution of its wheels. For illustration— when the emergency wheel will have been turned on its axis one-quarter of a revolution, the guideways assuming horizontal alignment, as shown in Figure 4, the disabled wheel will have been lifted. When the emergency wheel will have become advanced to one-half of a revolution, (see Figure 6) the guideways will have come to a vertical position, and the hub of the disabled wheel will have been transferred to, and it will be retained in position with its axis coincident with the axis of the emergency wheel. The nuts 26 and 27 are then screwed down on the studs, the cheek 15 being thereby clamped securely to the body structure of the emergency wheel. By my invention as described, the emergency wheel is so spaced from the disabled wheel as to be clear of the wheel fender F. The axis of the emergency wheel being in accurate alignment coincident with the axis of the car wheel, there is no interference with the steering of the car.

The need of a hand-jack or other special tools or appliances for lifting the car axle and its disabled wheel, is dispensed with. The inconvenience and delay of travel due to failure of the tires of any one of the automobile wheels, is minimized, it being possible for a person of only ordinary skill to install the invention readily and with relatively small effort. The emergency wheel then serves instead of the disabled wheel, and the car may be driven to destination, or to repair station, where the axle may be then supported by a jack or other suitable means. The emergency wheel may then be removed from its connection as just described, the disabled wheel being then available for such repairs as may be necessary to restore it to operative condition.

To remove the invention, the nuts 26 and 27 are unscrewed from the studs 17 and 18. The nuts D, at holes 20 of the cheek 16, are then removed from the bolts of the wheel hub. The yoke is then detached from the hub and it is then reunited with the emergency wheel by the aplication of nuts 26 and 27 to the said studs. The invention is compact, relatively light in weight, and is self contained. It is capable of being manufactured in various sizes, and as especially adapted to wheels of various styles and forms, by the making of only a few slight structural changes—changes that do not involve any considerable expense.

It is contemplated that the invention, made up in sets, may be useful also as an auxiliary wheel where dual tread area and capacity is desired. Obviously the rear cheek member of the yoke may be of any form suitable for being secured to the vehicle wheel.

In describing my invention, and illustrating it in the form and structure especially suitable for a wheel of average size and having a hub of common form, it will of course be understood that modifications may be made in the several features and details of the invention within the scope of the invention as it is defined in the appended claims, without departing from the spirit of the invention.

What I claim as my invention and desire to secure by Letters Patent, is—

1. A lifter device and emergency wheel, comprising a wheel having a body structure provided with aligned spaced radial guideways, a yoke having an open body to clear the hub portion of a disabled wheel, and being provided with a front cheek and a rear cheek, studs integral with the front cheek and adapted to slidingly occupy the said guideways, means in connection with the said studs to retain the yoke in detachable united relation with the said emergency wheel, and also to secure the said yoke against movement on said wheel, and a rear cheek on said yoke adapted to be detachably secured to the disabled wheel.

2. A device of the kind described, having a disk like body structure offset from the felly portion of the wheel and being provided with aligned spaced radial guideways, a yoke having a body portion to clear the hub of a disabled wheel and being provided with a front and a rear cheek, the said rear cheek being adapted to be secured to the hub portion of the disabled wheel, studs projecting from the front check and through the said guideways, and nuts screwed on said studs.

IRA P. NELSON.